Jan. 25, 1955  M. J. SHEFT  2,700,489
ROTATABLY MOUNTED DISPENSER FOR GRANULAR
MATERIAL IN MEASURED QUANTITIES
Filed June 18, 1951  2 Sheets-Sheet 1
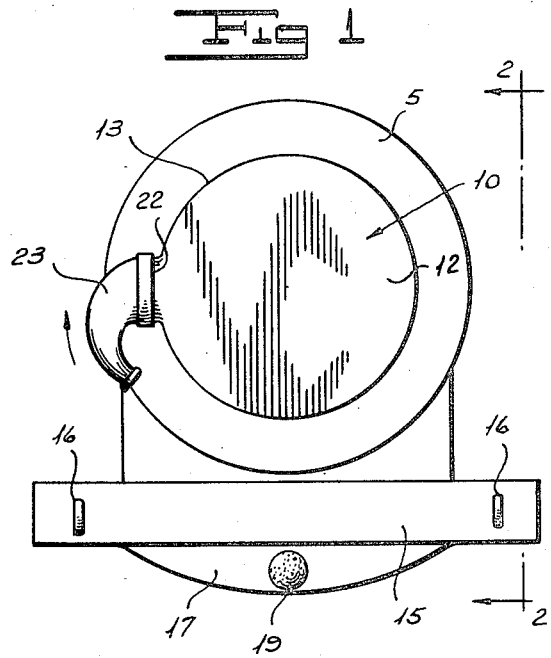
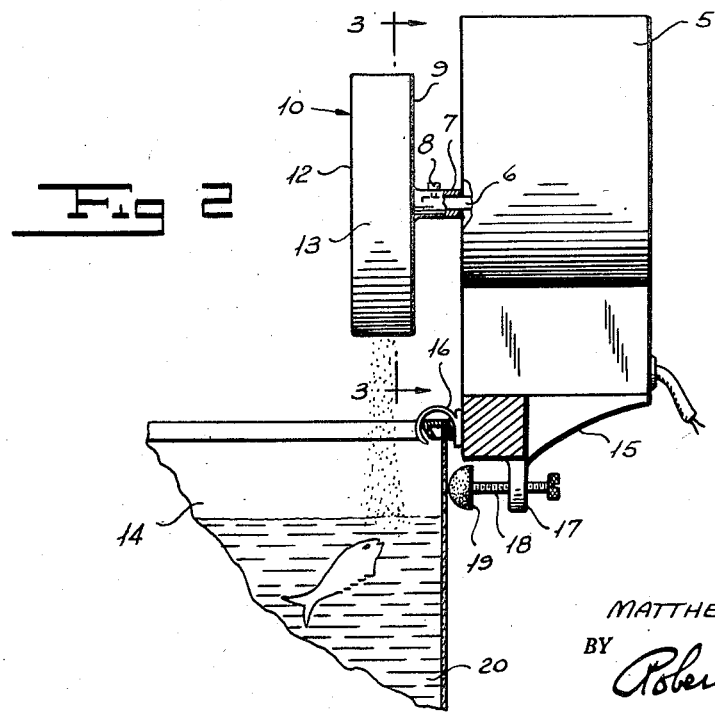
INVENTOR.
MATTHEW J. SHEFT
BY
*Robert F. Beck*
ATTORNEY

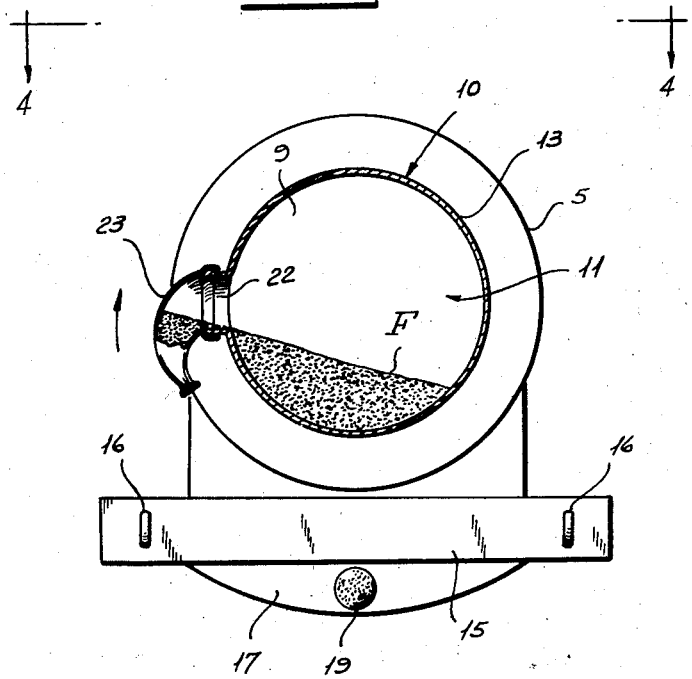
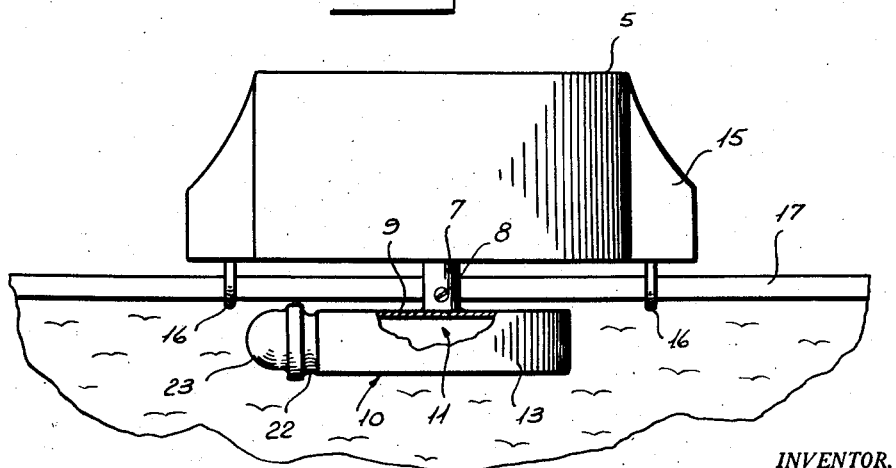

United States Patent Office 2,700,489
Patented Jan. 25, 1955

2,700,489

ROTATABLY MOUNTED DISPENSER FOR GRANULAR MATERIAL IN MEASURED QUANTITIES

Matthew John Sheft, Passaic, N. J.

Application June 18, 1951, Serial No. 232,229

3 Claims. (Cl. 222—170)

My invention relates to a feeder and more particularly to a feeding device which operates to intermittently supply food to captive animals, for instance, fish in an aquarium.

One of the objects of my invention is to provide a device capable of being detachably connected to an aquarium or the like for effecting intermittent feeding of fish contained in the aquarium.

Another object of my invention is to provide a device of the foregoing described character equipped with a horological instrument for effecting the feeding operation.

A further object of my invention is to provide a device of the foregoing described character equipped with means for metering the food discharged into the aquarium during a feeding period and which may be replaced by other metering means to vary the quantity discharged.

A still further object of my invention is to provide a device of the foregoing described character having a food containing chamber and equipped with means for metering the food from said chamber for discharge into an aquarium and which means effects mixing or agitation of the food within the chamber.

An important object of my invention is to provide a device of the foregoing described character which is simple in construction, durable in use, efficient in operation, economical in manufacture, capable of being detachably secured to various types and sizes of aquariums without modification, and requires a minimum of attention over appreciable periods of time.

With the above and other objects in view, as will hereinafter appear, the invention consists in the combination and arrangement of parts hereinafter set forth and illustrated in the accompanying drawings from which the several features of the invention and the advantages attained thereby will be readily understood by those skilled in the art.

Referring to the drawings wherein like reference characters designate like parts throughout the several views:

Figure 1 is a front elevation of my invention.

Figure 2 is a sectional view taken on the line 2—2 of Figure 1 and illustrating my invention in mounted relation on an aquarium.

Figure 3 is a sectional view taken on the line 3—3 of Figure 2 and detached from the aquarium.

Figure 4 is a top plan view of my invention.

In practicing my invention, as illustrated in the drawings, I provide a suitable horological instrument, for instance, an electric clock 5 and modify the latter in such a manner that the hour hand shaft may extend an appreciable distance forwardly of the face to provide an outwardly extending shaft section 6 on which is secured a collar 7 by means of a set screw 8. The collar 7 is connected centrally and in fixed relation with the rear wall 9 of a casing or cylinder 10 interiorly formed with a chamber 11, the latter being defined by said rear wall 9 and front and peripheral walls 12 and 13, respectively. A supply of fish food F or the like is contained within the chamber 11 for feeding fish in an aquarium 14, a portion of which is illustrated in Figures 2 and 4.

The clock 5 is mounted on a bracket 15 equipped on its front face with a pair of hooks 16 which are disposed over the upper end or rim of the aquarium 14. The bracket 15 is provided with a depending rib 17 through which is threaded a set screw 18 provided on the front end with a rubber cushion or bumper 19 for engaging the adjacent wall 20 of the aquarium 14. The bumper 19, when tightened against the wall 20, by the set screw 18, coacts with the hooks 16 to maintain the device in fixed relation with the aquarium and with the cylinder disposed thereabove as illustrated in Figure 2.

The peripheral wall 13 of the container is formed with an opening defined by a sleeve 22 integral with the wall 13 and which sleeve is fashioned with an outwardly disposed retaining rib for snap-fitting within a groove formed on the intake end of a discharge nozzle 23, the latter having an outlet end provided with a discharge opening or bore of a preestablished size. The nozzle may be constructed of a semi-pliable material of the so-called plastic group to permit ready attachment and detachment of the intake end upon and from the sleeve, it being understood that the nozzle is detached from the sleeve to permit loading of the chamber 11 with the food F.

In operation—assuming the device is mounted on the aquarium, the chamber 11 provided with a desired quantity of food F and that the cylinder 10 is rotating over a circular path and clockwise with the hour shaft of the clock 5—as the nozzle moves downwardly with the cylinder and through the discharge or lower zone of the path, the food gravitationally feeds into the intake end of the nozzle from the chamber and discharges from the nozzle through the outlet end thereof into the aquarium.

The size of the inlet port or bore of the intake end of the nozzle 23 is such as to meter a predetermined quantity of a particular type of food or material into the nozzle during each intermittent discharge period of the operation. The discharge opening, at the outlet end of the nozzle 23, is of a precalculated and proportionally smaller size than the inlet port, at the intake end of the nozzle, to limit the quantity of material or food discharged from the nozzle through the discharge opening. By means of this construction, some of the food or material is retained within the nozzle 23 for return to the chamber 11 during passing of the nozzle through the upper zone of the circular path over which the casing 10 travels. By thus retaining some of the food within the nozzle during discharge of the food therefrom, the food so retained is discharged or dumped back into the chamber 11 for mixing with and agitating the contents of the chamber. The nozzle may be replaced by one of several having different sizes of bores for increasing or decreasing the amount of food discharged during a feeding period to accord with the number or requirements of the fish and/or the type of food prescribed.

While I have disclosed by invention as employing an electric clock, it is to be understood that other timing means may be employed for effecting rotation of the cylinder over the aforementioned path. Moreover, the device may be operated in conjunction with other enclosures or pens in lieu of aquariums.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and subcombinations.

It is obvious that the invention is not confined to the herein described use therefore as it may be utilized for any purpose to which it is adaptable. It is therefore to be understood that the invention is not limited to the specific construction as illustrated and described, as the same is only illustrative of the principles involved which are capable of extended application in various forms, and the invention comprehends all construction within the scope of the appended claims.

Furthermore, it is to be understood that the food contemplated for use in the chamber of the casing or cylinder is preferably of the free-flowing and granular type although other types may be employed when suitable for discharge through the nozzle without clogging.

Some examples of prior art feeders are disclosed in the following patents and over which my invention has many advantages and desirable features:

UNITED STATES PATENTS

| Number | Name | Date |
|---|---|---|
| 735,167 | Steinberg | Aug. 4, 1903. |
| 742,415 | Hale | Oct. 27, 1903. |
| 848,101 | Hale | March 26, 1907. |
| 1,031,736 | Rosenberger et al | July 9, 1912. |
| 1,989,298 | Tingley | Jan. 29, 1935. |

What I claim is:

1. In a dispenser for dispensing powdered or granulated material in measured amounts, a casing provided with a chamber therein for accommodating said material and adapted to be connected to a motor for rotation thereby over a circular path having lower and upper zones, discharge means connected to said casing for rotation therewith and having an inlet port in communication with said chamber whereby material is gravitated from said chamber through said port into said means during passing of the latter through said lower zone, said means having a discharge opening of a precalculated and proportionally smaller size than said port to limit the quantity of material discharged from said means through said opening to thus effect retention of some of said material in said means for return to said chamber through said port during passing of said means through said upper zone.

2. In a dispenser for dispensing powdered or granulated material in measured amounts, a cylinder formed with a chamber therein for accommodating said material and having peripheral and radial walls defining said chamber and with one of said radial walls being provided with a coupling member adapted to be connected to a rotary member for rotation thereby over a circular path having lower and upper zones, a detachable discharge nozzle connected to said peripheral wall for rotation therewith and having an inlet port in communication with said chamber whereby material is gravitated from said chamber through said port into said nozzle during passing of the latter through said lower zone, said nozzle having a discharge opening of a precalculated and proportionally smaller size than said port to limit the quantity of material discharged from said nozzle through said opening to thus effect retention of some of said material in said nozzle for return to said chamber through said port during passing of said nozzle through said upper zone, said nozzle being detachable from said cylinder for replacement by another having an opening of a different size to vary said quantity.

3. In combination, a source of power having a drive shaft, a cylinder formed with a chamber therein for accommodating powdered or granulated material for discharge from said cylinder in measured amounts, said cylinder having peripheral and radial walls defining said chamber and with one of said radial walls being provided with a coupling member connected to said shaft for rotation thereby over a circular path having lower and upper zones, a detachable discharge nozzle connected to said peripheral wall for rotation therewith and having an inlet port in communication with said chamber whereby material is gravitated from said chamber through said port into said nozzle during passing of the latter through said lower zone, said nozzle having a discharge opening of a precalculated and proportionally smaller size than said port to limit the quantity of material discharged from said nozzle through said opening to thus effect retention of some of said material in said nozzle for return to said chamber through said port during passing of said nozzle through said upper zone, said nozzle being detachable from said cylinder for replacement by another having an opening of a different size to vary said quantity.

References Cited in the file of this patent

UNITED STATES PATENTS

| 139,732 | Paterson | June 10, 1873 |
| 742,415 | Hale | Oct. 27, 1903 |
| 848,101 | Hale | Mar. 26, 1907 |
| 912,296 | Dykes | Feb. 16, 1909 |
| 1,320,678 | Edwards | Nov. 4, 1919 |
| 1,640,528 | Bruhn | Aug. 30, 1927 |
| 1,989,298 | Tingley | Jan. 29, 1935 |
| 2,500,243 | Dixon | Mar. 14, 1950 |